United States Patent [19]

Klatt

[11] 4,215,426
[45] Jul. 29, 1980

[54] TELEMETRY AND POWER TRANSMISSION FOR ENCLOSED FLUID SYSTEMS

[76] Inventor: Frederick Klatt, 36 Ripley Rd., Medford, Mass. 02155

[21] Appl. No.: 901,459

[22] Filed: May 1, 1978

[51] Int. Cl.$^2$ .............................................. G01V 1/40
[52] U.S. Cl. ..................................... 367/83; 340/857; 181/106; 175/40
[58] Field of Search ........... 340/18 NC, 18 LD, 18 P; 181/106; 175/50; 166/177, 249; 33/307; 259/DIG. 43; 322/3; 310/30

[56] References Cited

U.S. PATENT DOCUMENTS

| | | | |
|---|---|---|---|
| 1,493,340 | 5/1924 | Hahnemann et al. | 322/3 |
| 2,524,031 | 10/1950 | Arps | 340/18 NC |
| 2,549,464 | 4/1951 | Hartley | 322/3 |
| 2,700,131 | 1/1955 | Otis et al. | 340/18 LD |
| 2,787,759 | 4/1957 | Arps | 340/18 NC |
| 2,890,019 | 6/1959 | Arps | 175/50 |
| 3,309,656 | 3/1967 | Godbey | 340/18 LD |
| 3,437,992 | 4/1969 | Johnston | 340/18 NC |
| 3,711,825 | 1/1973 | Claycomb | 340/18 LD |
| 3,792,428 | 2/1974 | Harrell et al. | 340/18 NC |

Primary Examiner—Nelson Moskowitz
Attorney, Agent, or Firm—Wolf, Greenfield & Sacks

[57] ABSTRACT

The system is described in connection with the control of downhole oil well drilling tools or instruments used in the oil drilling industry. Control wiring extends through the drill pipe employing magnetic coupling between pipe sections. Signal enforcers are provided at predetermined positions along the drill pipe to reinforce all signals communicated via the control wiring. These signal enforcers or repeaters are powered by an acoustic power transmission system which also provides operating power for the tools and instrumentation in the bottom of the well. The power transmission system includes an acoustic power generator or preferably a pair thereof disposed at the top of the drill pipe for establishing a plane acoustic pressure wave that propagates down the drill pipe, and one or more acoustic energy converters including means for converting a portion of the pressure wave to a DC voltage for powering each repeater. One or more converters at the bottom of the well are also used for powering tools and instrumentation.

21 Claims, 9 Drawing Figures

TELEMETRY AND POWER TRANSMISSION FOR ENCLOSED FLUID SYSTEMS

BACKGROUND OF THE INVENTION

The present invention relates in general to a power and communication (control) transmission system for use with an enclosed fluid apparatus such as a mud filled drill string of an oil well or other fluid filled pipe arrangement. One purpose of the present invention is to eliminate the need for a continuous electrical conductor requiring connections at each drill pipe coupling. Although the primary use of the system of this invention is for powering and/or communicating with downhole oil well drilling tools or instruments associated with the drill string, the system may also be used in association with any other type of enclosed fluid system. Most of the detailed description will, however, be directed to the use of the system in the drilling for oil.

Although there are presently available different schemes for signal communication in an oil well, there is still a need for an efficient and trouble-free system for powering and communicating with downhole tool or data gathering instruments. One communication technique employs direct cable connection between the top and bottom of the drill string. See for example, U.S. Pat. Nos. 3,918,537 and 3,879,097. This type of technique requires connection at each drill pipe section. If, for example, there is a fifteen thousand foot drill string, there are approximately five hundred joints or connections in such a length of drill pipe and there would have to also be five hundred coaxial connections. As each joint of drill pipe is connected, each connector of the cable also has to be connected. This technique drastically increases the time to lay down a string of drill pipe and also drastically increases the possibility of bad cable connections especially in long drill strings and in an environment that is quite dirty.

One improvement over such cable communication systems is a system of the type shown in U.S. Pat. No. 2,379,800 employing magnetically coupled circuits. However, again, in a long length of drill pipe there is a substantial chance for signal attenuation with such a system and in may practical applications this system is not useable.

In addition, there are systems that presently employ mud pulse telemetry. See for example U.S. Pat. Nos. 3,949,354; 3,964,556; and 3,958,217. In the Spinnler patent '217 it employs mud pulse telemetry but has disadvantages such as the fact that they restrict the flow of mud in the drill string thereby interfering with the necessary mud flow through the drill string which is used in facilitating the drilling operation; most important, they restrict the use of thru-drillpipe oil well logging tools. In the Gearhart patent '556 they are required to cease mud flow in order to provide signal communication thus definitely inhibiting the overall operation of their system. In the Claycomb patent '354 they provide for only data transmission and apparently require one or more power sources at the bottom of the well. On the other hand in accordance with the present invention there is provided relatively simple means for signal communication and also means for the transfer of power energy at one or more locations in the drill string.

Accordingly, one object of the present invention is to provide an improved telemetry and power transmission system for an enclosed fluid apparatus.

Another object of the present invention is to provide a power and communication transmission system employing control or signal wiring magnetically coupled from drill pipe section to drill pipe section.

Another object is to provide high-speed bi-directional communication.

A further object of the present invention is to provide a system in accordance with this invention that employs acoustics for power propagation in combination with electromagnetics for information propagation. The transmission of energy is by low frequency acoustics or sound waves. The acoustical pulses propagate through the fluid in the drill pipe and preferably comprise a plane acoustic pressure wave adapted to propagate in one direction down the drill string.

Still another object of the present invention is to provide a system in accordance with this invention that provides, at one or more locations, signal reinforcement means for reinforcing the control signals. The signal reinforcement means comprises an acoustic converter for detecting an acoustic power pulse and converting this acoustic signal to preferably a DC voltage signal for powering a repeater circuit or the like.

Still another object of the present invention is to provide a system in accordance with this invention employing means for establishing a plane acoustic pressure wave in the drill pipe, which pressure wave is received at the bottom of the drill pipe and converted into preferably a DC power signal for powering the tools or instrumentation at the bottom of the well.

Another object of the present invention is to provide a system in accordance with this invention wherein the acoustic generator means and the acoustic converter means are substantially non-intrusive to the normal flow of mud in the drill pipe. In accordance with the system of this invention there is preferably no substantial restriction to the mud flow during the acoustical operation, and further there is no requirement in accordance with this invention for interrupting or enhancing mud flow in order for the acoustic power transmission and the electromagnetic telemetry to take place. The only restriction is that there is mud present. In accordance with the invention the acoustic energy converter, like the acoustic power generator, permits the constant flow of mud, and yet absorbs energy from the acoustic pressure wave and converts this energy into a useable electrical energy for the telemetry system.

SUMMARY OF THE INVENTION

To accomplish the foregoing and other objects of this invention there is provided a power and communication transmission system for an enclosed fluid apparatus preferably in the form of a fluid pipe including one or more pipe sections. Although the present invention is described in conjunction with oil drilling apparatus, it is understood that the system may also be employed in conjunction with other enclosed fluid systems. The power and communication transmission system of this invention comprises transmission line means in the fluid apparatus communicating between spaced locations of the fluid apparatus which in the case of an oil well would be between the bottom and top of the drill string. The system also includes an acoustic energy generating means coupled to the fluid apparatus or fluid pipe for establishing in the fluid an acoustic pressure wave that propagates in the pipe generally toward the bottom of the drill string. The fluid typically in the oil drilling field is a mud that is pumped through the pipe usually at a constant flow rate for facilitating the drilling operation at the bottom of the well. The system of this invention also includes at least one acoustic energy converting means coupled to the fluid apparatus for absorbing a part of the energy of the pressure wave and converting the energy to an electric power signal which is usually a DC voltage that is obtained by means of a rectifier bridge circuit that senses an AC voltage from the acoustic energy converter. At least one signal reinforcing means is provided in the transmission line between the spaced locations. This reinforcing means receives the power signal from the acoustic energy converting means and is adapted to reinforce any communication signals being sent in the transmission line.

The transmission line means in accordance with the present invention preferably employs sections of transmission lines coextensive with and contained within a section of drill pipe. The sections of transmission line in each section of drill pipe are inductively coupled by means of a transformer coupling thus not requiring any direct electrical connection when the drill pipe sections are mated. The transmission line and the transformer coils are preferably contained in a thin plastic sleeve which is bonded or clamped to the interior surface of the drill pipe. When the drill pipe is joined, the transmission line is coupled magnetically, not physically, so that no special procedures are required for the drilling crew.

The acoustic energy generator allows a constant mud flow from the pumping station to pass to the drill string, as well as providing modulation of this mud flow with an acoustic pressure wave. It is desired and the system is designed so that the pressure wave propagates only toward the drill string and not toward the mud pumps. In a preferred arrangement discussed in detail hereinafter the energy generating means comprises a pair of acoustic generators resulting in a plane acoustic wave that propagates in only one direction with a standing wave being generated between the two acoustic generators.

The acoustic energy converter likewise preferably provides little or no impedance to the constant mud flow in the drill pipe and preferably generates a sinusoidal voltage coupled to a bridge circuit where the voltage is converted to a DC voltage for powering one or more signal reinforcing means along the transmission line or instrumentation and tools at the bottom of the well. The signal reinforcing means may be in the form of a repeater circuit including amplification means so that signals communicated from one end of the fluid pipe arrive at the other end substantially unattenuated.

In one arrangement the acoustic energy converter comprises inner and outer oscillating bodies and a coil and magnet for establishing the necessary sinusoidal output voltage. In another arrangement, an acoustic rectifier apparatus is employed for driving a turbine generator. In this alternate arrangement one of the advantages is that the system is frequency and wavelength independent so that the acoustic power adsorption by this acoustic energy converter is not drastically effected by variations in mud temperature, pressure and salinity.

BRIEF DESCRIPTION OF THE DRAWINGS

Numerous other objects, features and advantages of the invention should not become apparent upon a reading of the following detailed description taken in conjunction with the accompanying drawings, in which.

DETAILED DESCRIPTION

Figure 1:
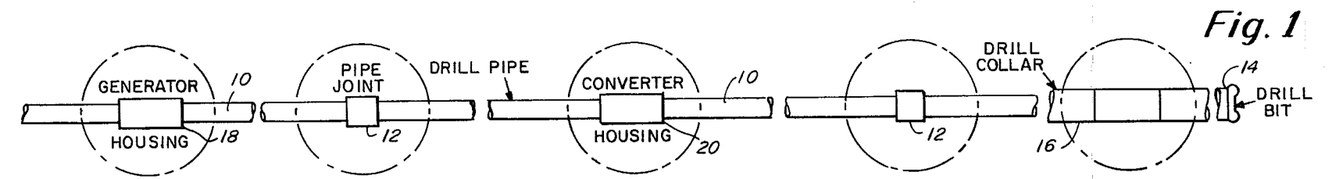
FIG. 1 is a mechanical schematic of a drill string employing the power and communication transmission system of this invention.

In accordance with the invention acoustic pressure pulses within the drill pipe are used for the propagation of power signals and preferably are used solely for the propagation of power signals. The control signals are propagated electromagnetically. FIG. 1 is a schematic representation of the drill pipe 10 showing pipe joints 12 therealong and also the drill bit 14 at the bottom of the drill string. Adjacent the drill bit there may also be provided one or more drill collars 16. Each of the drill collars is made of a heavier gage metal than the pipe sections and acts as a stabilizer for the drill bit for changing the center of gravity of the drill string when more or less drill collars are added to the drill string. As depicted the drill collars 16 are disposed close to the drill bit 14. The drill bit 14 is usually in the form of an auger for drilling into the earth. Each drill pipe section may be about 30 feet long with the ends of the pipe having complimentary mating threads tapered for speedy screwing and unscrewing. During the drilling operation, the drill pipe functions as a drive shaft for turning the drill bit and also functions as a conduit for the mud which is pumped through the pipe.

The drill pipe is normally filled with a drilling mud which is a fluid pumped under pressure to the well during the drilling operation. In the schematic representations of FIGS. 1 and 2 the mud pump is not shown but is understood to exist in conjunction with the drilling apparatus. The chemical composition of the mud may be changed during the drilling operation to, for example, lubricate the drill bit or to decrease formation differential pressure.

FIG. 1 also shows the acoustic energy generator 18 which is typically disposed near a top end of the drill string and one or more acoustic energy converters 20.

Figure 2:
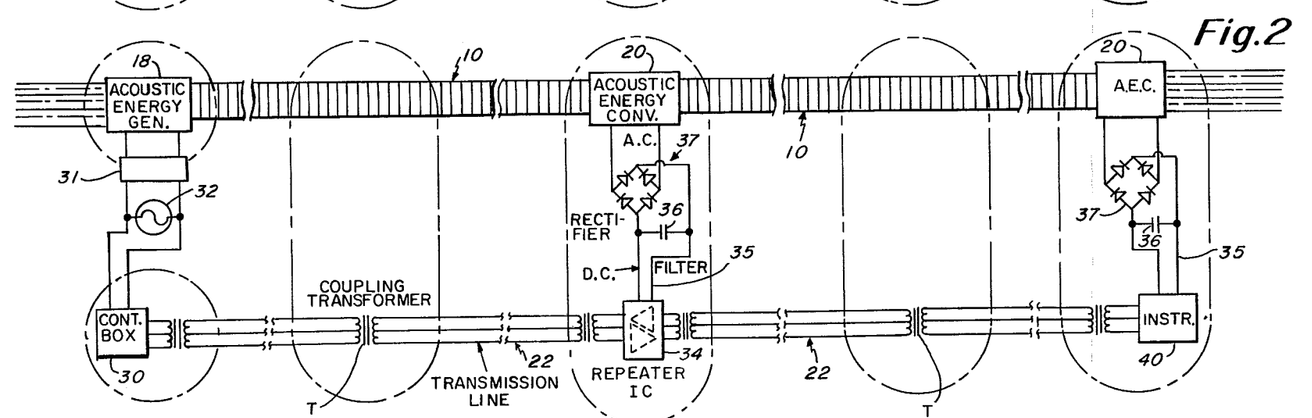
FIG. 2 is an acoustic and electric schematic diagram showing some detail of the system of this invention.
Figure 3:
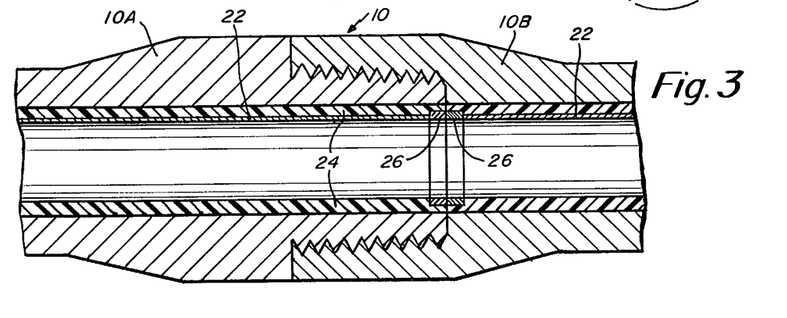
FIG. 3 is a fragmentary cross-sectional view through the drill pipe at a pipe joint also showing the magnetic coupling between transmission line sections.

FIG. 2 shows the drill pipe 10 with the pertinent sections thereof. FIG. 3 shows a cross-sectional detail of a drill pipe showing the interconnection between pipe sections 10A and 10B. The transmission line or lines 22 are contained within a thin plastic sleeve 24 in each section. The line 22 connects to a transformer coil 26.

As depicted in FIG. 3 the adjacent coils 26 are in alignment but need not touch as there is magnetic coupling between these coils. FIG. 2 shows schematically the coupling at transformer T formed by the combination of these magnetically coupled coils 26. Thus, when the pipe sections 10A and 10B are interconnected, there is signal communication between the transmission lines 22 by virture of the inductively coupled coils 26. The plastic sleeve 24 may be bonded or clamped to the drill pipe as shown in FIG. 3. The sleeve is preferably constructed of a plastic whose characteristic impedance closely matches that of water. In this way there will be a minimum restriction to flow with little attenuation of the acoustic pulse that propagates through the drill pipe.

Figure 9:
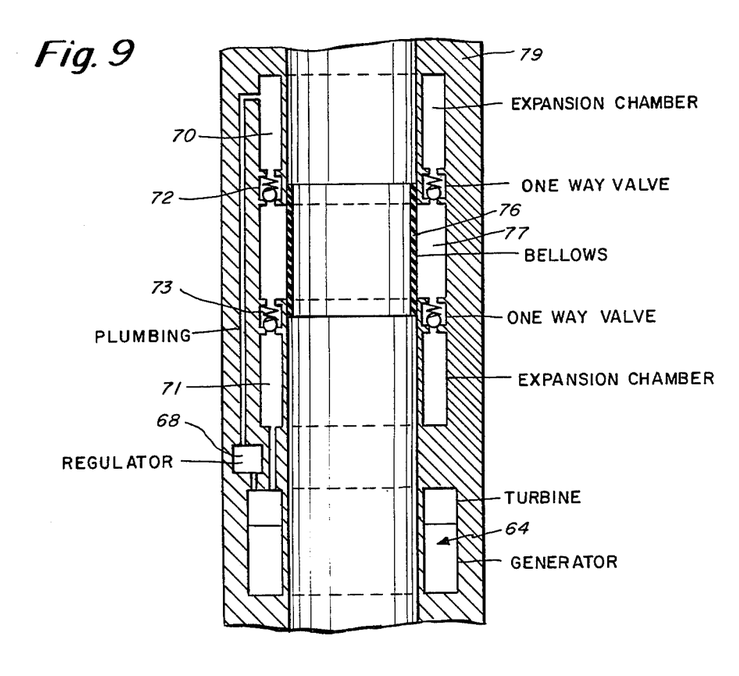
FIG. 9 shows the physical layout of the embodiment of FIG. 7 in a drill pipe.

FIG. 2 also shows the acoustic energy generator 18 which is shown and discussed in more detail hereinafter with reference to FIGS. 4 and 5. The acoustic energy converters 20 shown in FIG. 2 are also discussed in more detail hereinafter with reference to FIG. 6. An alternate converter construction is shown in FIGS. 7 and 9.

FIG. 2 shows a communication control box 30 which contains conventional circuitry for sending and receiving signals on the transmission line or lines 22. The transmission is by radio frequency electromagnetics. The tranmission is facilitated over transformer coupled transmission lines.

The acoustic generator control box 31 includes apparatus for operating the acoustic energy generator 18. The control box along with the generator 18 establish uni-directional acoustic pressure pulse in the drill pipe 10. In FIG. 2 the horizontal dotted lines represent a section of the drill pipe having constant fluid flow while the spaced vertical lines in the drill pipe represent fluid flow with acoustic modulation as established by the acoustic energy generator 18. Both the communication control box 30 and the acoustic generator control box 31 can be powered by a conventional electrical generator 32.

Because of the environment within which the transmission line extends (metal, salty mud, etc.) there will be fairly substantial attenuation of signals, particularly at the coupling transformers T. Therefore, at predetermined intervals along the drill string, a repeater 34 is inserted to compensate for this attenuation. The repeater 34 may be a conventional integrated circuit including amplifier means for communicating in both directions along the transmission line. Each of the repeaters 34 requires power which, as shown in FIG. 2 is coupled by way of the lines 35 from the filter capacitor 36 and bridge circuit 37. The repeaters 34 are actually powered from the acoustic energy absorbed at the converters which energy is converted into preferably a DC signal for powering each of the repeaters 34. A sinusoidal signal is present at the output of each of the converters 20 and the bridge circuit 37 is preferably a full wave rectifier bridge providing a DC output on the lines 35 which is filtered by means of the filter capacitor 36. In addition, other voltage changing circuitry may be employed so that the voltage changing circuitry may be employed so that the voltage on lines 35 is the proper voltage for operating the repeater 34.

An optimum distance between transformers T is essential for constant voltage regulation. Because the drill pipes are constantly connected and disconnected, it is possible that the transformer coils between sections will have a variable distance from one to the other upon each different connection; consequently, effecting the voltage regulation of the transformers T and effecting the communication signals. However, this possible problem is overcome by using frequency modulation in the transmission system along transmission lines 22. At the bottom of the well there is also disposed a converter 20 with associated bridge circuit 37 and filter capacitor 36. The power voltage in this case is coupled possibly directly to instrumentation 40 for providing operating power for any instrumentation or control tooling.

The wave equations for pressure, displacement and velocity for a simple plane acoustic wave are given by the following equations:

$$\text{pressure: } p(x,t) = kp_0 v^2 y_m \sin(wt+\text{¢}) \quad (1)$$

$$\text{displacement: } y(x,t) = y_m \cos(wt+\text{¢}) \quad (2)$$

$$\text{velocity: } v(x,t) = wy_m \sin(wt+\text{¢}) \quad (3)$$

where
¢ = +kx; transmission to left
¢ = −kx; transmission to right
$p_0$ = fluid density
v = phase velocity
k = angular velocity/phase velocity The preceding wave equations are simple wave equations because they neglect attenuation. Certainly, the system would not be sufficiently functional if the acoustic wave energy was absorbed before it reached the portion of the system that it is to power. However, attenuation is proportional to the frequency squared and if the acoustic frequency is low, then the attenuation is small and one can then approximate by using the simple plane acoustic wave equation stated above. Also, attenuation due to dimensional non-conformities in the drill pipe is frequency related with there being lower attenuation at the lower frequencies. Thus, in accordance with the invention the transmission of energy is by low frequency acoustics or sound waves.

The acoustic generator is designed so as to allow constant mud flow from the pumping station to pass to the drill string while at the same time modulating this mud flow with an acoustic pressure wave. In accordance with the invention there is established an acoustic pressure wave which propagates only down the drill string and not toward the mud pumps. In this way all acoustic energy is directed to the drill string and there are preferably no standing waves established in the drill string which might be caused if the plane wave that was established reflected back to the mud pump system. Also, by establishing a unidirectional pressure wave there is no chance of damage to the mud pump system due to the acoustic wave. The acoustic energy converter also must allow for the constant flow of mud and yet absorb energy from the pressure wave converting this energy into a useable electrical energy for the telemetry system.

With regard to the acoustic transmission in the drill string the characteristic impedance of the fluid system may be defined by the following equation:

$$z_{ofl} = P(x,t)/V(x,t) = p_0 v \quad (4)$$

where $p_0$ is the density of the fluid and v is the phase velocity of the wave.

As the mud flow changes or the density of the mud changes, which may well be the situation in a drilling operation, then the characteristic impedance also changes. In order to transfer an optimum amount of energy, there is provided an electrical means of changing the mechanical impedance of the energy converter to match the characteristic impedance of the mud. Also, to compensate to changes in mud flow, resulting in wavelength changes, a means of varying the frequency of the acoustic generator or a means of varying the distance between preferably two acoustic generators is easily provided.

One of the advantages of the acoustic system of the present invention is that power can be essentially tapped-off of the drill string at any point therealong simply by the use of an acoustic energy converter. With the acoustically powered reinforcing means of this invention the power dissipation required for communication is divided amongst each repeater section rather than being dissipated totally at the instrumentation. With the system of this invention no batteries are required for instrumentation powering. Thus, it is possible to use high power instrumentation without being concerned with providing battery power especially at the bottom of the well.

In accordance with the invention the control signalling or telemetry system employs radio frequency electromagnetics. The electromagnetic waves are transmitted over a transformer coupled transmission line. With such a system there are certain advantages such as the fact that no major modifications to the drill pipe are necessary, there simply being an insertion and bonding or clamping of the plastic tube which contains the transformer coils and the transmission line. There is also no major modification to the convention drill string rig-up and rig-down procedures; such as the cleaning in connection of electrical connectors of a cable system. In accordance with this invention with the use of a high frequency electromagnetics, the system is capable of high speed bi-directional information transfer for use with complex instrumentation. Because there are no physical connectors in the transmission line, there is no chance of moisture entering the transmission line and disabling the system.

Figures 4, 5:
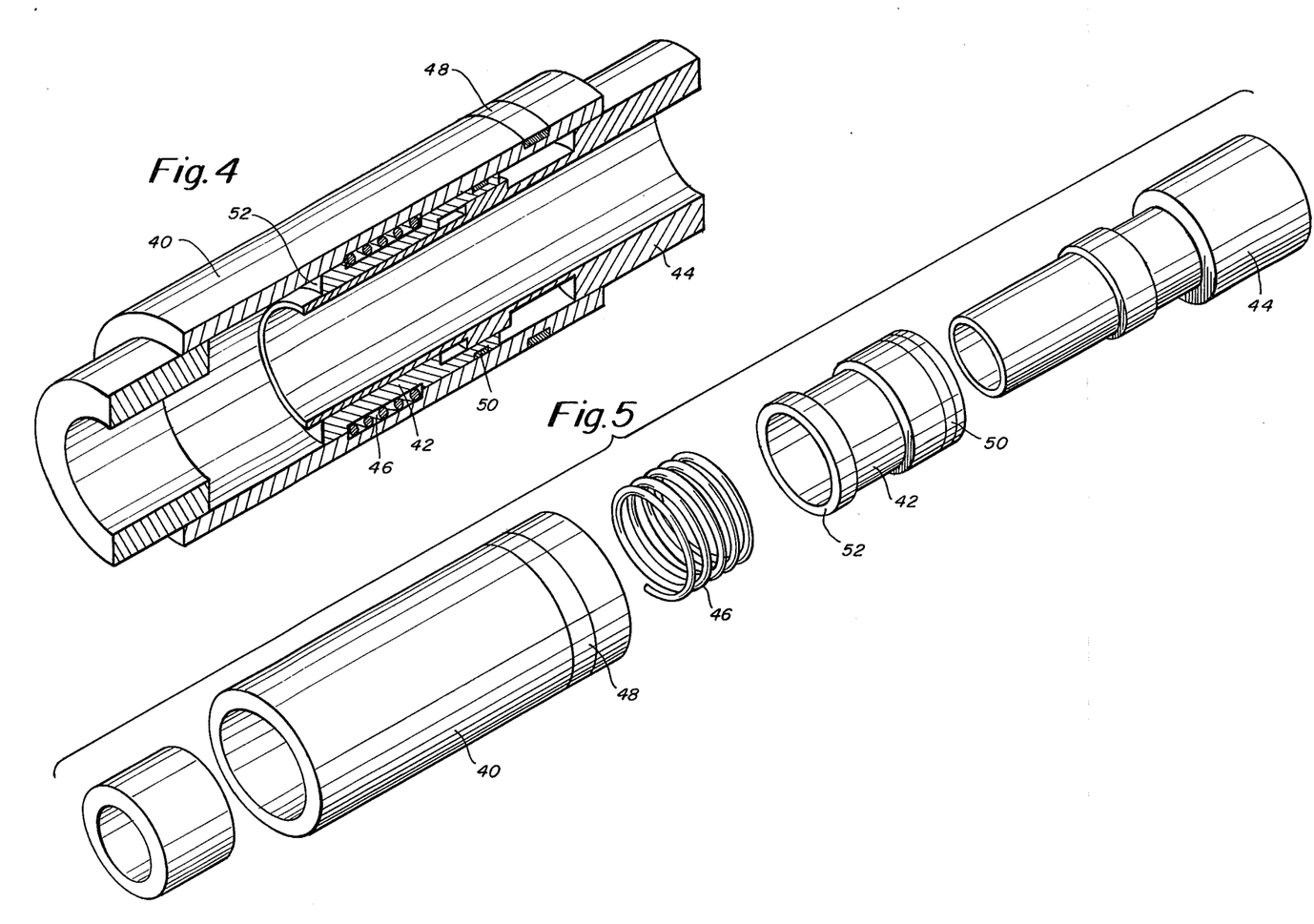
FIG. 4 is a partially cross-sectional view of the acoustic energy generating apparatus of this invention showing the details of one of the two generators used in a preferred system.
FIG. 5 is an exploded view of one of the generators shown in FIG. 4.

FIGS. 4 and 5 show an embodiment of the acoustic generator comprising a housing 40, plunger 42, guide 44, and resonating spring 46. The housing 40 has associated therewith a housing solenoid coil or permanent magnet 48 and similarly the plunger 42 has associated therewith a plunger solenoid coil 50. The plunger 42 has a plunger frontal area 52. By application of a sinusoidal voltage such as from the acoustic generator control box 31, to the coils 48 and 50, the plunger 42 may be set in oscillation with the frontal area 52 modulating the fluid within the pipe system. In the case of using a permanent magnet in place of coil 48, the sinusoidal voltage would be applied to coil 50.

Using Ampere's law and the equation for force on a current carrying conductor in a magnetic field, B, one can show that:

$$F_p(\text{force on the plunger}) = i_p 2\pi r_p n_p u h i_h n_h \quad (5)$$

where $i_p$ = current in plunger coil
$i_h$ = current in housing coil
$r_p$ = radius of plunger coil
$n_p$ = number of turns in plunger coil
$n_h$ = number of turns in housing coil
$u_h$ = magnetic permeability of housing.

If $i_p$ is a sinusoidal current ($i_p \sin w''t$) and $i_h$ is a direct current then:

$$F_p' = F_p \sin w''t \quad F_p = i_p 2\pi r_p n_p u_h i_h n_h \quad (6)$$

Because of the mechanical and electrical properties of the system (spring, plunger mass, electrical coils), the force, $F'_p$, will oscillate the plunger to the following displacement equation:

$$x = F_p/G \cos(w''t - \&); G = \sqrt{m^2(w''^2 - w^2)^2 + b^2 w''^2} \quad (7)$$
$$\& = \cos^{-1} bw''/G$$
$$w = \sqrt{K/m}$$

where:
m = mass of plunger
$w''$ = frequency of current source
K = spring force constant
b = damping of system or mechanical impedance ($Z_m$) of the system; $Z_m$ = Force/Velocity
If $w'' = w$, there is resonance and then:

$$x = (F_p/bw'') \cos(w''t)$$
$$dx/dt = \text{velocity} = (F_p/b) \sin w''t$$
$$d^2x/dt^2 = \text{acceleration} = (F_p/b) w' \cos w''t$$
$$\& = 0, 2\pi, 4\pi, \text{etc.} \quad (8)$$

At resonance, the pressure exerted on the liquid is the force of the plunger divided by the frontal area, A, of the plunger.

$$\text{Pressure, } P_. = F_p/A (\sin w''t) \quad (9)$$

P is the differential pressure (not including the static pressure) at the output of the acoustic generator. This acoustic generator will be at a fixed location in the mud conduction system. This will then be a boundary condition in the acoustic wave equations. The wave equations for acoustics are:

$$d^2P/dx^2 = (p_v/B) d^2P/dt^2$$

$$dy'/dx = (-1/B) dP/dt; \text{ y is the longitudinal displacement of particles; } y' = dy/dt$$

For simple plane waves the solution is:

$$P = k p_v v^2 y_m \sin(w''t - kx); \quad (10)$$

Where:
B = bulk modulus of elasticity
v = propogation speed = $\sqrt{B/P_v}$
$P_v$ = density
$k = 2\pi/\lambda = w''/v$
$\lambda = v/\text{freq.} = $ wavelength $$y' = w'' y_m \sin(w''t - kx) \quad (11)$$

At $x = 0$, equation 8 equals equation 11 and equation 9 equals equation 10 because the pressure pulse originated at the acoustic generator. Therefore, $$K p_v v^2 Y_m = w'' y_m p_v v = F_p/A \quad (12)$$

$$w'' y_m = F_p/b \quad (13)$$

Applying Eq. 4 this implies that $p_v v = b/A$ = the characteristic acoustic impedance; $b = p_v v A$, assuming all intrinsic damping is negligible.

If two acoustic generators, each excited by a current that is +90° out of phase with each other, are placed $\frac{3}{4}\lambda$, $1+\frac{3}{4}\lambda$, etc. apart, the resulting acoustic wave will propagate in one direction only with a standing wave generated between the two acoustic generators. Likewise, if the acoustic generators are excited by current sources which are −90° apart, then placing these generators $\frac{1}{4}\lambda$, $1\frac{1}{4}\lambda$, etc. apart will have the same results.

A complete acoustic generator uses two acoustic generators which are excited with the proper phase shift and placed at the proper distance from each other as previously discussed. The impact of the results is that the acoustics are directed away from the fluid pumping stations and directed through the drill string at four times the power radiation than a single acoustic generator. This prevents damage to the fluid pumping system and prevents standing waves (no power transfer) caused by wave reflections.

Power transfer is generally related to:
(a) The distance between the plunger of generator one and generator two, and the phase shift between the current sources.
(b) Impedance Matching.
(c) Amplitude of the current sources.

The preceding design uses electricity to produce the acoustic modulation. Hydraulics or compressed air could also be used.

Figure 6:
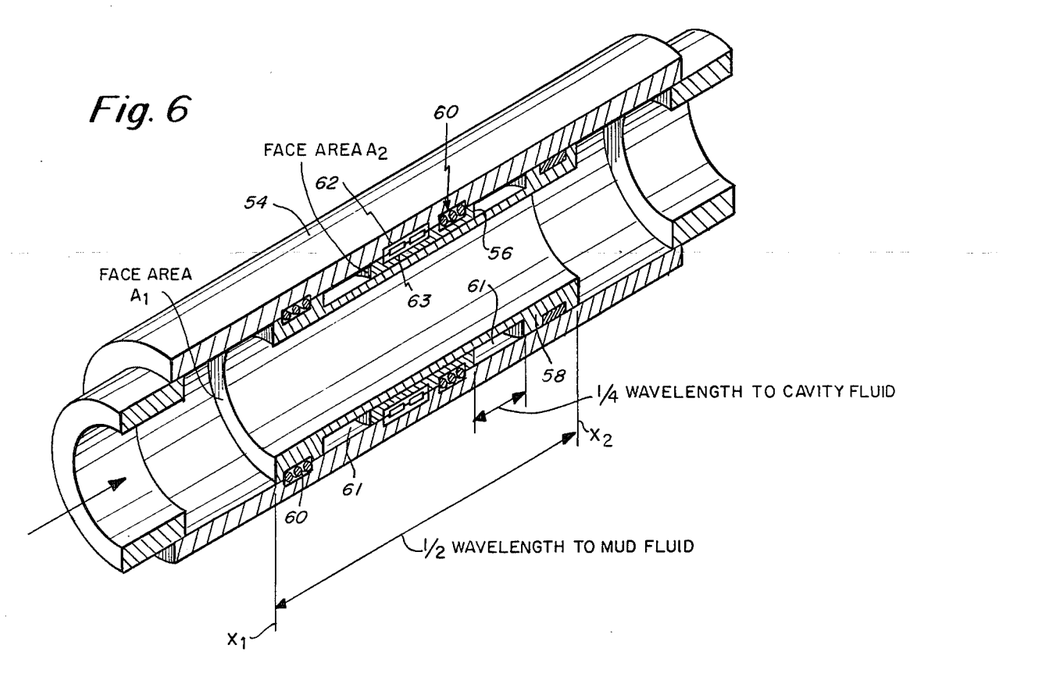
FIG. 6 is a cross-sectional view similar to the one shown in FIG. 4 for the acoustic energy converter, one or more of which may be used with the system.
Figure 7:
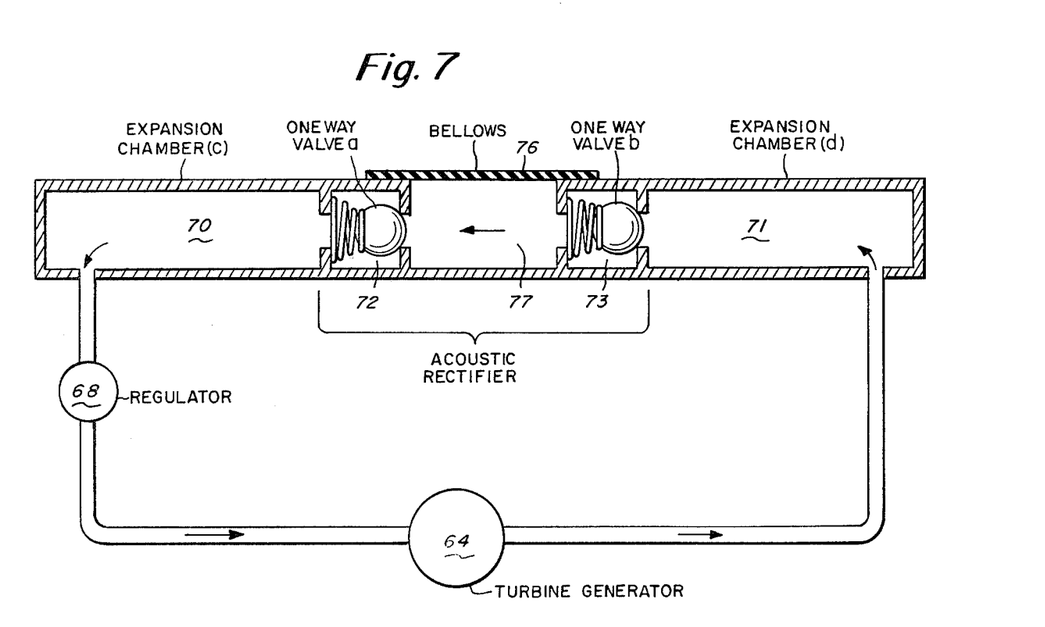
FIG. 7 is a schematic diagram of an alternate construction for the acoustic energy converter of this invention forming a turbine generator.

FIG. 6 shows an embodiment of the acoustic energy converter comprising a housing 54, an inner oscillator body 56, an outer oscillator body 58, resonating springs 60, quarter-wave cavities 61, converter housing coil 62, inner oscillator body magnet 63. The inner oscillating body 56 has a face area A2 depicted in FIG. 6 while the outer body 58 has a face area A1.

Assuming there is an acoustic wave traveling through the acoustic energy converter in one direction only (no reflections), then the pressure at $x_1$ and $x_2$ will be:

$$P_{x1} = B_1 \sin(w''t - kx_1) \quad (14)$$

$$P_{x2} = B_2 \sin(w''t - kx_2); B = k p_v v^2 Y_m \quad (15)$$

$B_1 \neq B_2$ because of attenuation.
The total force on the outer oscillator body will be:
Force$= (P_{x1} - P_{x2}) A_1$; $A_1 =$ frontal area of oscillator housing. Therefore, $$Force = A_1 (B_1 \sin(w''t - kx_1) - B_2 \sin(w''t - kx_2))$$

Optimum performance occurs when:

$$x_2 - x_1 = \text{one-half wavelength}$$

The force on the outer oscillator body then becomes:

$$Force = A_1 (B_1 + B_2) \sin w''t \quad (16)$$

Just like the acoustic generator, the acoustic converter has a forced iscillation system because of its mechanical (spring, mass, damping) and electrical properties.

If the driving force is:

$$Force = A_1 (B_1 \sin(w''t - kx_1) - B_2 \sin(w''t - kx_2))$$

Then:
Displacement of the outer oscillator body $= x = (A_1/G)$
$(B_1 \cos(w''t - kx_1 - \mathfrak{c}) - B_2 \cos(w''t - kx_2 - \mathfrak{c}))$ $$G = \sqrt{m^2(w''^2 - w^2) + b^2 w''^2}$$

$$\mathfrak{c} = \cos^{-1}(bw''/G)$$

$$w = \sqrt{K/m}$$

Where:
$w''$ = frequency of the pressure wave
$k$ = spring force constant
$b$ = damping of the system
$A$ = area of oscillator body Velocity of the outer oscillator body $= dx/dt = (A_1/G)w''(B_1 \sin(w''t - kx_2 - \mathfrak{c}))$ If one designs the system for resonance ($w = \sqrt{K/m}$) then at resonance:

$$x = (A_1/bw'')(B_1 \cos(w''t - kx_1) - B_2 \cos(w''t - kx_2))$$
$$dx/dt = (A_1/b)(B_1 \sin(w''t - kx_1) - B_2 \sin(w''t - Kx_2))$$

The mechanical impedance of the system is defined as:

External force/velocity $= Z_m$

At resonance the mechanical impedance ($Z_m$) is b: the damping and resistive properties of the system. By applying equation 4 the impedance properties of the fluid near the outer oscillator body will approach the mechanical impedance divided by the frontal area of the outer oscillator body ($Z_m/A_1$) because the area around the outer oscillator body is small compared to the wavelength of the low frequency acoustic wave.

Therefore: $Z_{of1} = P(x,t)/V(x,t) = Z_m/A_1 =$ $$\frac{B_1 \sin(w''t - kx_1) - B_2 \sin(w''t - kx_2)}{(A_1/G) w'' (B_1 \sin(w''t - kx_1 - \mathfrak{c}) - B_2 \sin(w''t - kx_2 - \mathfrak{c}))}$$

As one changes b (damping and electrical resistive properties of the system) the outer oscillating body will simulate a different fluid impedance; likewise, the fluid impedance ($Z_{of1}$) near the oscillating body will change.

In this design, ($x_2 - x_1$) is chosen to be one-half wavelength and $W'' - w$ (resonance).

The inner and outer oscillating bodies are separate and free moving bodies whose motion dynamics are related as follows:

$Z_a - b_1/A_1 = Z_O$; the characteristic impedance of the mud.

$Z_b = B_1/Z_2$ $Z_c - b_2/A_2$ $Z_b Z_c = Z_1^2;$ (17)

Za is the simulated fluid impedance of the outer oscillating body to the mud. Zb is the simulated fluid impedance of the outer oscillating body to the cavity fluid. Zc is the simulated fluid impedance of the inner oscillating body to the cavity fluid. Z1 is the characteristic impedance of the cavity fluid. A1, A2 are the cross-sectional areas. b2 is the damping of the inner oscillator and considering little friction is directly related to the electrical properties of the generator section. b1 is the damping of the outer oscillator body and considering little friction is related to b2.

Designing the cavity distance to be a quarter-wave results in what is known is acoustic wave theory as a quarter wave transformer and relates the impedances Zb and Zc by equation 17. Solving these equations for Zc in terms of Z0 results in the following: $(Z1^2 \cdot A2)/A1 = Zc \cdot Z0$. The significance of this equation is that if $Z1 < Z0$, & $Z1 > Z2$, then $Zc < Z0$. Since the displacement of the bodies are inversely proportional to the impedances, the displacement of the inner body will be larger than the outer body. For an example, if the outer body was designed to match the impedance of water at resonance and was stimulated by a hundred p.s.i. at hundred hertz pressure wave, then the maximum displacement would be approximately 0.003 ft. This displacement would be impractical for power generation; however, the inner oscillating body can be designed for a much larger displacement on the order of inches while keeping the outer body matched to the mud impedance.

A sinusoidal voltage can be generated in the converter housing coil by the relative oscillatory motion of the inner oscillator body magnet with respect to the converter housing coil. Applying Faraday's Law of Induction, the induced voltage at the output of the converter housing generator coil is directly related to the velocity of the inner oscillator body.

$$Voltage = d\phi/dt = d(B'dc \times Area)/dt;$$

$B'dc$ is the magnetic field of the inner oscillator body magnet. Area is the area within the converter housing coil which is cut by the inner oscillator body's magnet flux.

$\phi$ is magnetic flux $Voltage = B'dc \times d(Area)/dt$; $B'dc$ is a constant The differential, $d(Area)/dt$, is proportional to the velocity of the inner oscillator body.

$Voltage \propto B'dc \times dx/dt$; $dx/dt$ is the velocity of the inner oscillator body.

The higher the current (power) generated in the converter housing coil, the more force (damping) required to oscillate the inner and outer oscillating bodies; therefore, a conventional matching circuit will vary the electrical load on the converter housing coil in order to match the acoustic converter to the mud impedance.

The oscillator body may cause unacceptable vibrations when functioning because of its mass (larger mass implies larger vibrations). This can be remedied by placing two oscillator bodies (or two acoustic energy converters) of equal oscillator body mass at odd multiples of a half-wavelength apart.

Each oscillator body will then have opposing movements which will cancel the causes of vibration.

The wavelength is assumed to remain constant or the change in wavelength due to mud flow change or mud density is small. If not, the wavelength can be kept constant by changing the frequency of the acoustic energy generator; or instead, the distance between the acoustic generators can be changed for optimum output.

Figure 8:
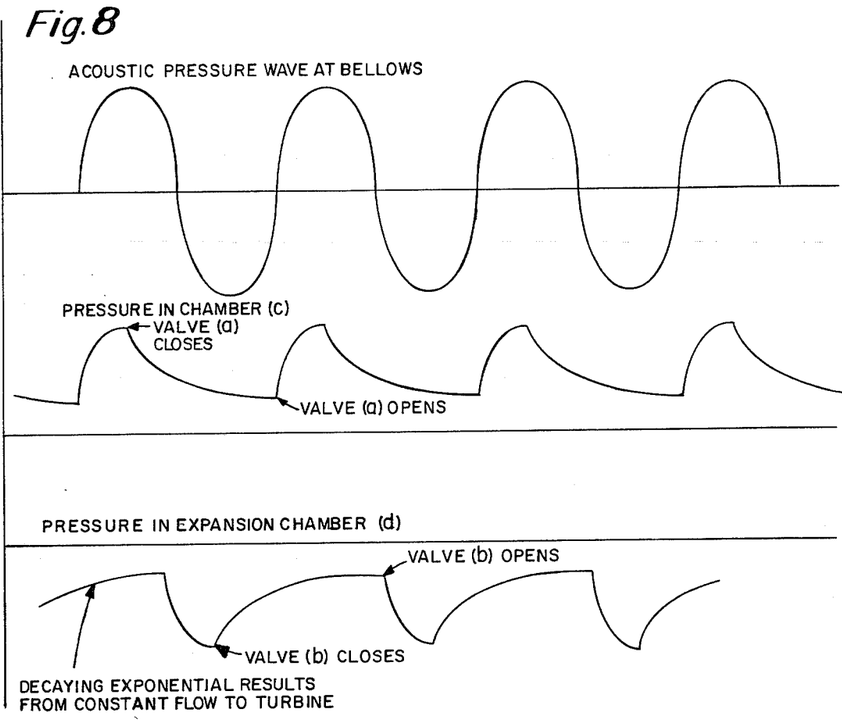
FIG. 8 shows waveforms associated with the embodiment of FIG. 7.

FIGS. 7-9 show an alternate embodiment for the acoustical energy converter. In the embodiment of FIG. 6 there are some disadvantages which are overcome by the second embodiment. Some disadvantages of the first embodiment are:

1. because the acoustic energy converter is tuned to the acoustic wave (long wavelength), the size of the acoustic energy converter is long; 2. the wavelength of the acoustic wave can change due to temperature, mud viscosity pressure, and salinity changes; therefore, a means of tuning the acoustic converter and generator to these changes may be incorporated; 3. additional power beyond the physical means of an individual acoustic converter will require additional acoustic converters in cascade. Because of the size of an individual acoustic converter, a cascaded system will be monstrous; 4. to match the impedance of the mud, the systems resistance must be varied. The system burns this power whether it is used to power devices or diverted to the matching electrical circuit. Vibrations due to the oscillating bodies of the acoustic converters is present.

FIG. 7 shows a schematic diagram of the alternate system which overcomes many of the problems mentioned above. FIG. 8 shows waveforms associated with this alternate embodiment and FIG. 9 is a schematic mechanical type diagram showing the placement of the components of this system in the drill pipe.

In the embodiment of FIG. 7 there are a turbine generator 64, a regulator 68, expansion chambers 70 and 71, and one-way valves 72 and 73. The acoustic converter shown in FIG. 7 operates on a closed loop system as depicted. The system of FIG. 7 also includes a rubber sheet 76 which functions as a bellows. As the pressure of the sinusoidal acoustic wave increases positively, the bellows compresses and pushes fluid through the one-way valve 72 into the expansion chamber 70. This fluid flow continues until the pressure in the chamber 70 equals the pressure in the bellows chamber 77. As the pressure of the acoustic wave drops, the one-way valve 72 closes and the one-way valve 73 opens allowing the pressure in the expansion chamber 71 to equalize with the pressure in the bellows chamber 77. Hence, the bellows and the pair of one-way valves 72, 73 function as an acoustic rectifier as clearly depicted in the waveforms of FIG. 8. Further, the expansion chambers 70 and 71 act as storage areas and acoustic pulse filters. The pressure regulator 68 permits a constant flow to pass to the turbine 64.

One possible arrangement for the system shown in FIG. 7 is depicted in FIG. 9 which shows in a schematic block fashion, each of the components essentially linearly arranged in a housing 79 which may form a part of the drill pipe. It is noted in the embodiment of FIG. 9 that the system is non-intrusive to the mud flow and provides little or no interference with the normal flow of mud through the drill string.

For low frequency acoustics the system of FIGS. 7 and 9 have the following advantages:

1. the system is frequency and wavelength independent; so not affected by mud temperature, pressure, salinity, etc.

2. the system is compact because it is not dependent on frequency and wavelength; so it can be cascaded with additional units for additional power;

3. uses only the necessary power (because of pressure regulation) needed by the system it is powering;

4. can run on a lower acoustic frequency because of the wavelength independence. Lower acoustic frequencies means lower attenuation. There are no vibrational problems because there are no oscillating bodies.

Having described a limited number of embodiments of this invention, it should now be apparent to those skilled in the art that numerous other embodiments are contemplated as falling within the scope of this invention. For example, in the embodiment of FIG. 7 a one-way ball valve is shown. However, other types of one-way valves may also be substituted therefor.

What is claimed is:

1. A power and communication transmission system for an enclosed liquid filled conduit means comprising;

parameter communication means disposed at a bottom end of the conduit means and for sending communication signals to the top of the conduit means, transmission line means associated with said fluid conduit means extending between top and bottom ends thereof for electrically transmitting signals from the parameter communication means to the top of the conduit means, liquid pump means at a top of the conduit means for pumping liquid therethrough toward the bottom thereof, acoustic energy generating means within the conduit means, defining a through passage having a cross-sectional area at least on the order of the cross-sectional area of the conduit means to permit free flow of liquid therethrough, disposed at the top of the conduit means for establishing a substantially unidirectional oscillatory acoustic pressure wave in the pressurized liquid, said pressure wave propagating in the fluid toward the bottom end of the conduit means, at least one acoustic energy converting means disposed at the bottom of the conduit means in communication with the pumped liquid pressure wave for absorbing at least a part of the energy of said pressure wave and converting said energy to a corresponding electric power signal, and means for coupling the power signal to the parameter communication means to provide operating power for communication signal transmission via the transmission line means.

2. A system as set forth in claim 1 wherein said conduit means comprises an enclosed pipe having a fluid pumped therethrough under pressure, said fluid column in said pipe being the medium for the transmission of said acoustic pressure wave, said energy generating means causing modulation of the flow by the pressure wave.

3. A system as set forth in claim 2 wherein said energy generating means includes electrically driven reciprocating means in the wall of the enclosed pipe for causing said modulation, said reciprocating means defining a passage at least of cross-section substantially like the cross-section area of the pipe for permitting free flow of fluid through the generating means.

4. A system as set forth in claim 3 wherein said energy generating means includes a source of an alternating voltage, a stationary housing, coil means associated with the stationary housing and reciprocating means, means for applying the alternating voltage to the coil means and means for biasing the reciprocating means.

5. A system as set forth in claim 4 wherein said acoustic energy converting means includes a pair of relatively oscillatory bodies disposed in the wall of the pipe having output leads with an alternating voltage established thereacross in response to the pressure wave sensed by the oscillatory bodies.

6. A system as set forth in claim 1 wherein said acoustic energy converting means includes means responsive to the pressure wave for causing mechanical oscillation converted into an electrical oscillating signal.

7. A system as set forth in claim 1 wherein said acoustic energy converting means includes means responsive to the pressure wave for causing fluid oscillation convertible into an electrical oscillating signal.

8. A system as set forth in claim 7 wherein said acoustic energy converting means includes a turbine generating means.

9. A system as set forth in claim 1 wherein said transmission line means includes transformer coupling means between fluid pipe sections.

10. A system as set forth in claim 9 including sheath means for encasing the transmission line.

11. A system as set forth in claim 1 including at least one other acoustic energy converting means in combination with signal reinforcing means in the transmission line means, said other acoustic energy converting means providing an electrical energy signal for powering the signal reinforcing means.

12. A system as set forth in claim 1 including signal reinforcing means in the transmission line means.

13. A system as set forth in claim 1 wherein said energy generating means comprises electrically driven reciprocating means in the conduit means for causing modulation of the liquid pressure wave operating in a direction radially of the conduit means.

14. A system as set forth in claim 13 wherein said reciprocating means defines a passage at least of cross-section substantially like the cross-section area of the conduit means for providing substantially unobstructed flow of the liquid.

15. A system as set forth in claim 14 wherein said energy converting means also includes means within the conduit means permitting unobstructed flow therethrough.

16. A system as set forth in claim 1 wherein said energy generating means causes modulation of the liquid pressure wave operating in a direction transversely of the liquid flow direction.

17. A system as set forth in claim 1 wherein said energy generating means causes modulation of the liquid pressure wave operating in a direction transversely of the liquid flow direction.

18. A system as set forth in claim 1 wherein said energy converting means includes means within the conduit means defining a through passage having a cross-sectional area of at least on the order of the area of the conduit means to permit free flow of the liquid therethrough.

19. A power and communication transmission system for use with a fluid filled conduit means, said system comprising;

parameter communication means disposed at a bottom end of the conduit means and for sending communication signals to the top of the conduit means, transmission line means associated with the conduit means extending between top and bottom ends thereof for electrically transmitting signals from the parameter communication means to the top of the conduit means, fluid pump means at a top of the conduit means for pumping fluid therethrough toward the bottom thereof, acoustic energy generating means disposed at the top of the conduit means for establishing a substantially unidirectional oscillatory acoustic pressure wave in the pressurized fluid, said pressure wave propogating in the fluid toward the bottom end of the conduit means, at least one acoustic energy converting means disposed at the bottom of the conduit means in communication with the pumped fluid pressure wave for absorbing at least a part of the energy of said pressure wave and converting said energy to a corresponding electric power signal, means for coupling the power signal to the parameter communication means to enable communication signal transmission via the transmission line means, and at least one other acoustic energy converting means in combination with signal reinforcing means in the transmission line means, said other acoustic energy converting means providing an electric energy signal for powering the signal reinforcing means.

20. A power and communication transmission system for use with a fluid filled conduit means, said system comprising;

parameter communication means disposed at a bottom end of the conduit means and for sending communication signals to the top of the conduit means, transmission line means associated with the conduit means extending between top and bottom ends thereof for electrically transmitting signals from the parameter communication means to the top of the conduit means, fluid pump means at a top of the conduit means for pumping fluid therethrough toward the bottom thereof, acoustic energy generating means disposed within and at the top of the conduit means for establishing a substantially unidirectional defining a through passage having a cross-sectional area at least on the order of the cross-sectional area of the conduit means to permit free flow of liquid therethrough oscillatory acoustic pressure wave in the pressurized fluid, said pressure wave propogating in the fluid toward the bottom end of the conduit means, at least one acoustic energy converting means disposed at the bottom of the conduit means in communication with the pumped fluid pressure wave for absorbing at least a part of the energy of said pressure wave and converting said energy to a corresponding electric power signal, and means for coupling the power signal to the parameter communication means to enable communication signal transmission via the transmission line means, said acoustic energy generating means comprising first and second generators displaced one from the other to provide unidirectional signal propogation.

21. A system as set forth in claim 20 wherein the generators are excited by currents that are 90° out of phase.

* * * * *